(12) United States Patent
Baruch et al.

(10) Patent No.: US 8,813,089 B2
(45) Date of Patent: Aug. 19, 2014

(54) MANAGING RESOURCES FOR MAINTENANCE TASKS IN COMPUTING SYSTEMS

(75) Inventors: Lior Baruch, Lehavim (IL); Roman Govsheev, Rishon LeZion (IL); Ariel J. Ish-Shalom, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 13/287,894

(22) Filed: Nov. 2, 2011

(65) Prior Publication Data

US 2013/0111490 A1    May 2, 2013

(51) Int. Cl.
 *G06F 9/46* (2006.01)
(52) U.S. Cl.
 USPC .......................................... 718/104
(58) Field of Classification Search
 USPC .......................................... 718/104
 See application file for complete search history.

(56) References Cited

U.S. PATENT DOCUMENTS

| | | | |
|---|---|---|---|
| 6,341,303 B1 * | 1/2002 | Rhee et al. ............... | 718/104 |
| 7,058,947 B1 * | 6/2006 | Raja et al. ............... | 718/104 |
| 7,457,762 B2 * | 11/2008 | Wetzer et al. ............ | 705/7.25 |
| 7,596,788 B1 * | 9/2009 | Shpigelman .............. | 718/100 |
| 7,698,453 B2 | 4/2010 | Samuels et al. | |
| 8,423,975 B1 * | 4/2013 | Scallon ................... | 717/135 |
| 8,473,956 B2 * | 6/2013 | Kindel et al. ............ | 718/102 |
| 2004/0244001 A1 * | 12/2004 | Haller et al. ............ | 718/100 |
| 2006/0053043 A1 | 3/2006 | Clarke | |
| 2007/0143764 A1 | 6/2007 | Kern et al. | |
| 2007/0234365 A1 * | 10/2007 | Savit ...................... | 718/104 |
| 2008/0126547 A1 * | 5/2008 | Waldspurger ............ | 709/226 |
| 2010/0325637 A1 * | 12/2010 | Radmilac et al. ....... | 718/104 |

OTHER PUBLICATIONS

Steer et al, A Feedback-driven Proportion Allocator for Real-Rate Scheduling, USENIX Feb. 1999, 15 pages.*
Ishfaq Ahmad et al., "A Semi Distributed Task Allocation Strategy for Large Hypercube Supercomputers," IEEE, May 1990, pp. 898-907.
W. McCoy, "Implementation guide for the ISO Transport Protocol (RFC1008)," www.ip.com, Jun. 1, 1987, 65 pages.
Sree Rama Kumar Yeddanapudi et al., "Risk-Based Allocation of Distribution System Maintenance Resources," IEEE Transactions on Power Systems, vol. 23, No. 2, May 2008, pp. 287-295.

* cited by examiner

*Primary Examiner* — Diem Cao
(74) *Attorney, Agent, or Firm* — Griffiths & Seaton PLLC

(57) ABSTRACT

Systems for managing resources for maintenance tasks in computing systems are provided. One system includes a controller and memory coupled to the controller, the memory configured to store a module. The controller, when executing the module, is configured to determine an amount of available resources for use by a plurality of maintenance tasks in a computing system and divide the available resources between the plurality of maintenance tasks based on a need for each maintenance task. One method includes determining, by a central controller, an amount of available resources for use by a plurality of maintenance tasks in a computing system and dividing the available resources between the plurality of maintenance tasks based on a need for each maintenance task. Computer storage mediums including a computer program product method for managing resources for maintenance tasks in computing systems are also provided.

8 Claims, 3 Drawing Sheets

```
1   TASK_X_RATE_LIMIT_SELECTOR::INIT()
2   {   max_limit ← A }

3   TASK_X_RATE_LIMIT_SELECTOR::GET_RATE_LIMIT()
4   {
5       current_limit_percent ← CALC_TASK_PERCENT (X)
6       return (max_limit x current_limit_percent)
7   }
```
310

```
1   CALC_TASK_PERCENT(task)
2   {
3       result ← 0
4       mutex.LOCK()
5       {
6           resources_percents_array ← CALC_TASKS_PERCENTS()
7           result ← resources_percents_array[task]
8       }
9       mutex.UNLOCK()
10
11      return result
12  }
```
320

```
1   CALC_TASKS_PERCENTS()
2   {
3       // check mission critical workload
4       work_load ← CHECK_SYSTEM_MISSION_CRITICAL_LOAD()
5
6       // calculate tasks urgencies
7       foreach task {
8           urgencies_array[task] ← CALC_TASK_URGENCY()
9       }
10      maintenance_urgency ← MAX(urgencies_array)
11
12      overall_percent ← CALC_OVERALL_PERCENT(maintenance_urgency,
                                                work_load)
13
14      relative_percents_array ← CALC_RELATIVE_PERCENTS(urgencies_array)
15
16      // determine each task's percent
17      foreach task {
18          result_array[task] ← (relative_percents_array[task] x
19                                overall_percent)
20      }
21
22      return resources_percents_array
23  }
```
330

MANAGING RESOURCES FOR MAINTENANCE TASKS IN COMPUTING SYSTEMS

BACKGROUND OF THE INVENTION

1. Field of the Invention

The present invention relates generally to computing systems, and more particularly to systems for managing resources for maintenance tasks in computing systems.

2. Description of the Related Art

Data deduplication is an emerging field in storage systems in recent years. The core idea a data deduplication is storing single instances of duplicated data. A challenge to deduplication is to efficiently locate duplicated data patterns in typically large repositories, and to store those data patterns in an efficient deduplicated storage form.

Deduplicated data entities might become obsolete or fragmented over time. This means that the deduplicated storage systems might need to perform maintenance tasks (e.g., delete tasks or "defragment" tasks, etc.) on the deduplicated data entries or rearrange the physical storage space on which the deduplicated data entries reside.

Typically, the various maintenance tasks responsible for maintaining the deduplicated data entries are performed by a plurality of controllers. Specifically, a different controller manages each maintenance task and each controller is responsible for controlling the rate at which its maintenance task is performed. For example, a delete task that deletes deduplicated data entries at a nominal rate is managed by a first controller, while a defragment task that defragments deduplicated data entries at a physical rate is managed by a second controller. Since current computing systems utilize multiple controllers, these computing systems do not utilize system resources as efficiently as they otherwise could use system resources.

SUMMARY OF THE INVENTION

Various embodiments provide systems for managing resources for maintenance tasks. One system comprises a controller and memory coupled to the controller, the memory configured to store a module. The controller, when executing the module, is configured to determine an amount of available resources for use by a plurality of maintenance tasks in a computing system and divide the available resources between the plurality of maintenance tasks based on a need for each maintenance task.

Methods for managing resources for maintenance tasks in computing systems are also provided in various other embodiments. One method comprises determining, by a central controller, an amount of available resources for use by a plurality of maintenance tasks in a computing system and dividing the available resources between the plurality of maintenance tasks based on a need for each maintenance task.

Various other embodiments provide physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for managing resources for maintenance tasks in computing systems. One physical computer storage medium comprises computer code for determining, by a central controller, an amount of available resources for use by a plurality of maintenance tasks in a computing system and computer code for dividing the available resources between the plurality of maintenance tasks based on a need for each maintenance task.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3 is a diagram illustrating an algorithm of one embodiment of pseudo code for implementing the method of FIG. 2 in computer-executable code.

DETAILED DESCRIPTION OF THE DRAWINGS

The embodiments illustrated below provide systems and methods for managing resources for maintenance tasks. Also provided are physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for managing resources for maintenance tasks in computing systems.

Figure 1:
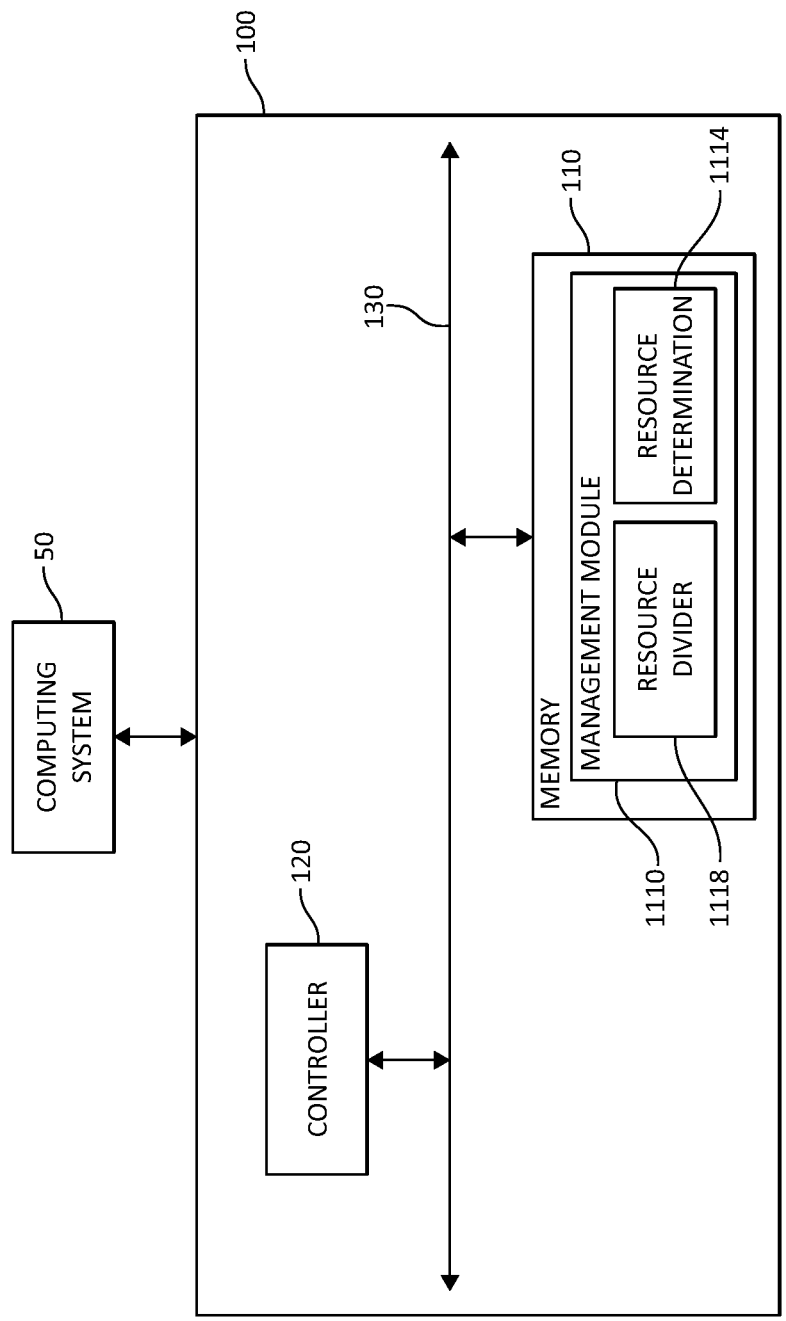
FIG. 1 is a block diagram of one embodiment of a system for managing resources for maintenance tasks.

Turning now to the figures, FIG. 1 is a block diagram of one embodiment of a system 100 for managing resources for maintenance tasks in a computing system 50 (e.g., a deduplicated storage system) coupled to system 100. At least in the illustrated embodiment, system 100 comprises memory 110 coupled to a controller 120 via a bus 130 (e.g., a wired and/or wireless bus).

Memory 110 comprises one or more physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, and/or a magnetic storage device). In one embodiment, memory 110 comprises a management module 1110 for managing resources for maintenance tasks in computing system 50.

Management module 1110, in various embodiments, comprises computer-executable code for managing resources for maintenance tasks in computing system 50. Management module 1110 may be written in any combination of one or more programming languages, including an object-oriented programming language such as Java, Smalltalk, C++, and/or the like, and conventional procedural programming languages, such as the "C" programming language or similar programming languages.

In one embodiment, management module 1110 comprises a resource determination mechanism 1114 for determining the amount of resources that are available for maintaining computing system 50 and a resource divider mechanism 1118 for dividing the determined available resources amongst a plurality of maintenance tasks for computing system 50. In the various embodiments of management module 1110, resource determination mechanism 1114 and resource divider mechanism 1118 are each written in computer-readable code capable of being executed by controller 120.

Controller 120, in one embodiment, is configured to execute the code that comprises management module 1110 and, particularly, resource determination mechanism 1114 and resource divider mechanism 1118. When executing resource determination mechanism 1114, controller 120 is configured to determine the amount of resources in computing system 50 that are available for use by one or more tasks (e.g., maintenance tasks) responsible for maintaining and/or servicing input/output (I/O) operations in computing system 50. In one embodiment, controller 120 is configured to measure the nominal throughput of computing system 50 to determine to amount of available resources. Specifically, controller 120 is configured to subtract the nominal throughput from the maximum throughput of computing system 50 to determine the amount of resources available in computing system 50.

In another embodiment, controller 120 is configured to count the number of input/output (I/O) operations per second that computing system 50 performs to determine to amount of available resources. Specifically, controller 120 is configured to subtract the number of I/O operations per second that computing system 50 is currently performing from the maximum the number of I/O operations per second that computing system 50 is capable of performing to determine the amount of resources available in computing system 50.

In other embodiments, controller 120 is capable of determining the amount of available resources by using a combination of measuring the nominal throughout and the current number of I/O operations that computing system 50 is currently performing. That is, controller 120 capable of combining the measured nominal throughput and the measured number of I/O operations per second in computing system 50 to determine the amount of available resources in computing system 50.

In one embodiment, controller 120 is further configured to execute resource divider mechanism 1118 to determine which maintenance tasks need to be performed in computing system 50 and to determine which resources of the determined available resources should be allocated to which maintenance tasks. Specifically, controller 120 is configured to determine which data processing task(s) or algorithm(s) to perform based on the maintenance needs of computing system 50. For example, when there are no mission critical tasks, ninety percent (90%) of the available resources in computing system 50 may be allocated for deletion and/or defragmentation tasks. After the needed maintenance tasks are determined, controller 120 is configured to determine how to allocate the available resources amongst the, for example, maintenance tasks.

In determining how to allocate the available resources, controller 120 is configured to execute resource divider mechanism 1118 to calculate the urgency and/or need for each particular maintenance task. For example, when computing system 50 is experiencing a large backlog of data waiting to be deleted, the urgency of the deletion task is elevated. In response thereto, controller 120 is configured to allocate a larger portion of the available resources to the deletion task. For example, if the backlog of data waiting to be deleted is very large and the other maintenance tasks in computing system 50 are not experiencing a backlog, controller 120 may allocate eighty percent (80%) of the available resources or seventy-two percent (72%) of the overall resources (i.e., 90%×80%=72%) of computing system 50 to the delete task, while further dividing the remaining twenty percent (20%) of the available resources of computing system 50 to the remaining maintenance task(s) that need servicing.

Since every type of maintenance task has its own set of rate limits to control its data processing rate, controller 120 is configured to divide the available resources amongst the maintenance tasks based on the type of rate limit for each respective maintenance task. Specifically, controller 120 is configured to translate the amount of available resources determined via resource determination mechanism 1114 to the limit set for a particular maintenance task because, for example, a defragmentation task uses physical throughput to measure its rate, while the deletion task uses nominal throughput. Because different maintenance tasks use different rate limits, the same percentage of resources may be translated to different sets of rate limits for different maintenance tasks. For example, a defragmentation task may translate 10% of system resources to 25 physical MB/sec, while a deletion task may translate the same 10% of the system resources to 400 nominal MB/sec limitations.

Controller 120 is further configured to monitor computing system 50 to determine the amount of resources available for maintaining computing system 50 and adjust the amount of resources allocated to each maintenance task on a continuous, substantially continuous, or periodic basis. Specifically, as other tasks in computing system 50 need or release system resources, the amount of resources available for maintenance tasks may decrease or increase, respectively. Here, by continuously, substantially continuously, or periodically determining the amount of available resources in computing system 50, controller 120 is capable of making adjustments to the amount of resources allocated to the various maintenance tasks.

Furthermore, controller 120 is configured to monitor the various maintenance tasks that need servicing and adjust the amount of allocated system resources to each maintenance task on a continuous, substantially continuous, or periodic basis. Specifically, as maintenance tasks are performed, the urgency of a maintenance task may increase or decrease based on the operation of computing system 50. As such, controller 120 is configured to continuously, substantially continuously, or periodically determine the urgency of each maintenance task and make adjustments to the amount of resources allocated to the various maintenance tasks based on the latest determination.

For example, after a deletion task has been performing for a period of time, the backlog of I/O operations may have decreased such that the urgency of the deletion tasks has decreased and, as a result, the urgency of defragmentation tasks may have increased. Here, during the continuous, substantially continuous, or periodic monitoring of computing system 50, controller 120 will decrease the amount of available resources allocated to the deletion task and increase the amount of available resources to the defragmentation task. Furthermore, the amount of increase/decrease is also dependent on the amount of available resources in computing system 50, which is also monitored and/or adjusted on continuous, substantially continuous, or periodic basis.

Figure 2:
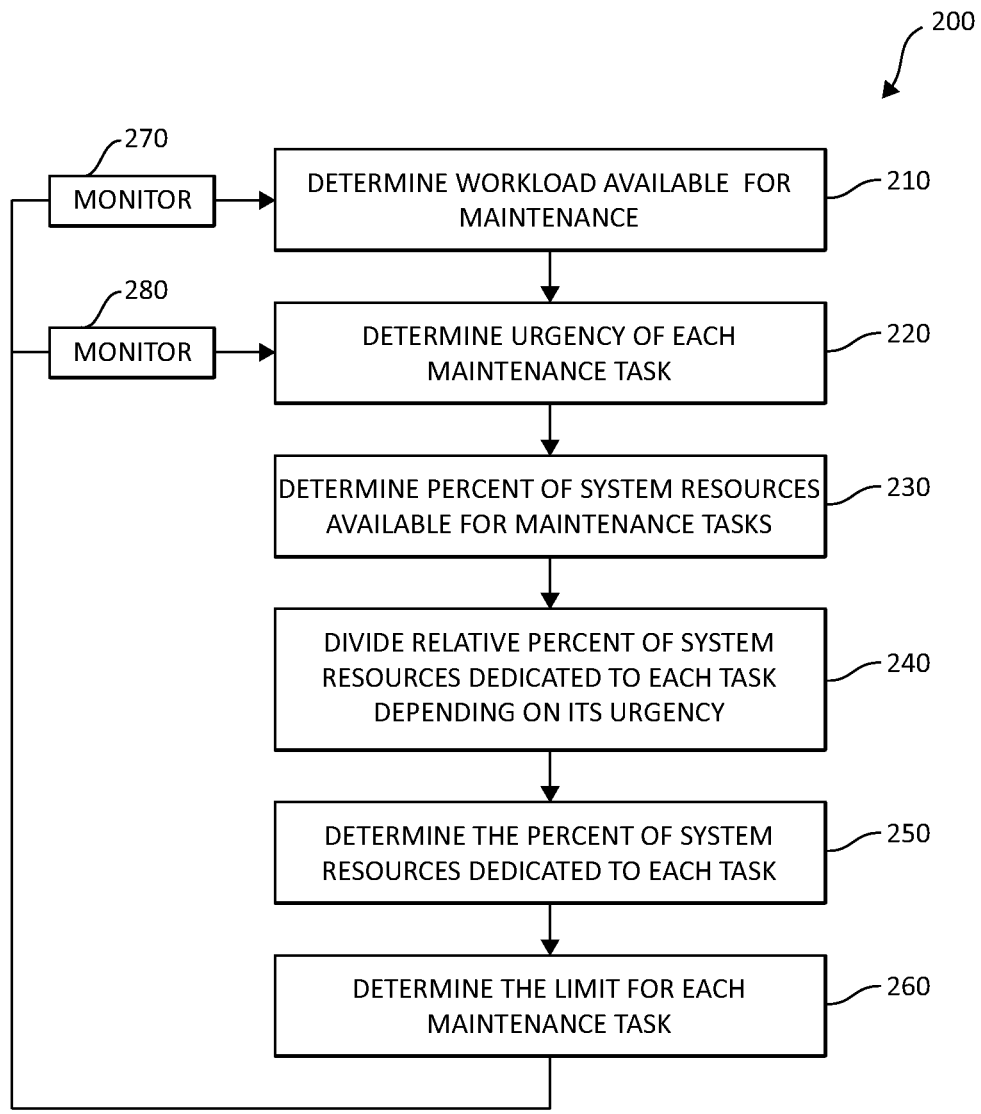
FIG. 2 is a flow diagram of one embodiment of a method for managing resources for maintenance tasks in computing systems.

Turning now to FIG. 2, FIG. 2 is a flow diagram of one embodiment of a method 200 for managing resources for maintenance tasks in a computing system (e.g., computing system 50). At least in the illustrated embodiment, method 200 begins by determining, by a controller (e.g., controller 120), the workload in the computing system available for or needing maintenance (block 210).

Method 200 further comprises determining the urgency of each maintenance task (block 220). The urgency of each maintenance task, in one embodiment, is based on the amount of maintenance each particular task needs at a particular point in time. For example, a maintenance task that includes a larger backlog of operations will be deemed more urgent than a maintenance task with a smaller backlog. In another example, each maintenance task may be provided with a predetermined hierarchy of importance and the urgency is determined by combining the amount backlog and the hierarchy of importance for each respective task.

In one embodiment, method 200 further comprises determining the amount of those resources available for allocation to maintenance tasks (block 230). After the amount of resources available for the maintenance tasks is determined, method 200 includes dividing the available resources amongst the maintenance tasks based on the determined urgency of each respective maintenance task (block 240).

The amount of system resources allocated to each task is determined by multiplying the amount of system resources available for maintenance tasks and by the divided available resources (block 250). For example, if sixty percent (60%) of the overall system resources are allocated for maintenance tasks and a particular maintenance tasks is determined to need fifty percent (50%) of the available resources, the particular maintenance task will be allocated thirty percent (30%) of the overall system resources (i.e., 60%×50%). The remaining allocated system resources will be divided amongst the remaining maintenance task(s). Specifically, the other 30% of the overall system resources will be divided amongst the other maintenance task(s) based on their respective urgencies.

Method 200 further comprises determining the limit for each maintenance task (block 260). In other words, the amount of available resources for each maintenance task is translated from a percentage to the limit set for a particular maintenance task. For example, a defragmentation task may translate 30% of system resources to 75 physical MB/sec, while a deletion task may translate the same 30% of the system resources to 1200 nominal MB/sec limitations.

In one embodiment, method 200 comprises monitoring the computing system to determine the workload available for maintenance consistent with block 210 (block 270). In another embodiment, method 200 comprises monitoring the computing system to determine the urgency of each maintenance task consistent with block 220 (block 280).

With reference now to FIG. 3, FIG. 3 is a diagram illustrating an algorithm 300 of one embodiment of pseudo code for implementing the method of FIG. 2 in computer-executable code. At least in the illustrated embodiment, algorithm 300 comprises a TASK_X_RATE_LIMIT_SELECTOR module 310. TASK_X_RATE_LIMIT_SELECTOR module 310 is responsible for holding the maintenance task's limit and converting the resources given to the maintenance task to the relevant parameters. In one embodiment, in the initialization phase a controller is given the maximal limit, representing 100 percent of the system resources. In line 5 of TASK_X_RATE_LIMIT_SELECTOR module 310, the controller determines the resources percent and translates the percentage to the maintenance task's limit by, for example, multiplying the percentage by a measurement vector.

CALC_TASK_PERCENT (task) module 320 calculates each maintenance task's percentage by calling to CALC_TASKS_PERCENTS 330 and returning the specified maintenance task's result. Notably the whole algorithm is a critical section encapsulated in mutual exclusion (see lines 4, 9 of CALC_TASKS_PERCENTS 330).

CALC_TASKS_PERCENTS ( ) module 330 calculates the amount available resources, which results may be cached to increase performance. Here, the mission critical workload is determined. Next, in lines 7 through 10 of CALC_TASKS_PERCENTS ( ) module 330, the urgency of each maintenance task is determined. In line 12 of CALC_TASKS_PERCENTS ( ) module 330, the overall percentage of system resources dedicated to the maintenance tasks is determined. This function takes into consideration the system workload and the urgency of each respective maintenance task. This function may use predefined values for each urgency-workload combination or compute the result using the system workload and urgency.

Line 14 of CALC_TASKS_PERCENTS ( ) module 330 calls a method that calculates the relative percentages between the maintenance tasks according to their respective urgencies. For example, in a situation that includes two maintenance tasks, a 50%-50% division is returned when the maintenance tasks have the same urgency or a 90%-10% division is returned when one maintenance task is more urgent than the other maintenance task. In lines 17 to 20 of CALC_TASKS_PERCENTS ( ) module 330, each maintenance task's overall percentage is determined by multiplying the maintenance task's relative percentage and the overall system resources as calculated in line 13 of CALC_TASKS_PERCENTS ( ) module 330.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A system for managing resources for maintenance tasks, comprising:
   a controller; and
   memory coupled to the controller, the memory configured to store a module, wherein, when executing the module, the controller is configured to:
      determine an amount of available resources for use by a plurality of maintenance tasks in a computing system, and
      divide the available resources between the plurality of maintenance tasks based on a need for each maintenance task and based on a type of rate limit for each respective maintenance task, wherein, when dividing the available resources, the controller is configured to:
         assign a first percentage of the available resources to a first maintenance task,
         assign a second percentage of the available resources to a second maintenance task,
         translate the first percentage to a nominal rate for performing the first maintenance task, and
         translate the second percentage to a physical rate for performing the second maintenance task.

2. The system of claim 1, wherein, when determining the amount of available resources, the controller is configured to determine a nominal throughput of the computing system.

3. The system of claim 1, wherein, when determining the amount of available resources, the controller is configured to determine a number of input/output operations performed by the computing system within a predetermined amount of time.

4. The system of claim 1,
   wherein the first percentage and the second percentage are determined based on the maintenance needs of the computing system at a particular point in time.

5. A physical computer storage medium comprising a computer program product method for managing resources for maintenance tasks in computing systems, the physical computer storage medium comprising:
   computer code for determining, by a central controller, an amount of available resources for use by a plurality of maintenance tasks in a computing system; and
   computer code for dividing, by the central controller, the available resources between the plurality of maintenance tasks based on a need for each maintenance task and based on a type of rate limit for each respective maintenance task, wherein the computer coded for dividing the available resources comprises computer code for:
      computer code for assigning a first percentage of the available resources to a first maintenance task,
      computer code for assigning a second percentage of the available resources to a second maintenance task, computer code for translating the first percentage to a nominal rate for performing the first maintenance task, and computer code for translating the second percentage to a physical rate for performing the second maintenance task.

6. The physical computer storage medium of claim 5, wherein the computer code for determining the amount of available resources comprises computer code for determining a nominal throughput of the computing system.

7. The physical computer storage medium of claim 5, wherein the computer code for determining the amount of available resources comprises computer code for determining a number of input/output operations performed by the system within a predetermined amount of time.

8. The of physical computer storage medium claim 5, wherein the first percentage and the second percentage are determined based on the maintenance needs of the computing system at a particular point in time.

* * * * *